(12) United States Patent
Nakayama

(10) Patent No.: US 7,350,801 B2
(45) Date of Patent: Apr. 1, 2008

(54) KNEE-PROTECTING AIRBAG

(75) Inventor: Kazuhiro Nakayama, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 408 days.

(21) Appl. No.: 10/878,438

(22) Filed: Jun. 29, 2004

(65) Prior Publication Data

US 2005/0006880 A1    Jan. 13, 2005

(30) Foreign Application Priority Data

Jul. 11, 2003  (JP) .............................. 2003-273270
Jul. 11, 2003  (JP) .............................. 2003-273274

(51) Int. Cl.
*B60R 21/22* (2006.01)

(52) U.S. Cl. ................................ 280/730.1; 280/743.1

(58) Field of Classification Search ............ 280/730.1, 280/743.1, 743.2, 752, 731, 742
See application file for complete search history.

(56) References Cited

U.S. PATENT DOCUMENTS

| | | | | |
|---|---|---|---|---|
| 5,165,716 | A * | 11/1992 | Imai et al. ................ | 280/730.1 |
| 5,275,434 | A * | 1/1994 | Hirabayashi et al. ..... | 280/743.1 |
| 5,378,019 | A * | 1/1995 | Smith et al. ............. | 280/743.1 |
| 5,464,250 | A * | 11/1995 | Sato ......................... | 280/743.1 |
| 5,607,183 | A * | 3/1997 | Nishimura et al. ...... | 280/743.2 |
| 5,713,598 | A * | 2/1998 | Morita et al. ............ | 280/743.1 |
| 5,826,905 | A * | 10/1998 | Tochacek et al. ........ | 280/743.1 |
| 5,884,574 | A * | 3/1999 | Sogi et al. ................ | 112/441 |
| 6,155,595 | A * | 12/2000 | Schultz ..................... | 280/729 |
| 6,315,324 | B1 * | 11/2001 | Keshavaraj ............... | 280/743.2 |
| 6,435,553 | B1 * | 8/2002 | Wipasuramonton et al. ......................... | 280/743.1 |
| 6,523,855 | B2 * | 2/2003 | Musiol et al. ............ | 280/729 |
| 6,916,039 | B2 * | 7/2005 | Abe .......................... | 280/729 |
| 2001/0030418 | A1 * | 10/2001 | Keshavaraj .............. | 280/743.2 |
| 2001/0035634 | A1 * | 11/2001 | Breed ....................... | 280/730.2 |
| 2003/0184069 | A1 * | 10/2003 | Takimoto et al. ........ | 280/743.1 |

FOREIGN PATENT DOCUMENTS

| | | |
|---|---|---|
| JP | A-52-5126 | 1/1977 |
| JP | A-6-024282 | 2/1994 |
| JP | A-2000-190804 | 7/2000 |
| JP | A-2002-337649 | 11/2002 |
| JP | A-2003-054352 | 2/2003 |
| JP | A-2003-175793 | 6/2003 |
| JP | A-2004-352012 | 12/2004 |
| WO | WO 02/04261 A1 | 1/2002 |

* cited by examiner

*Primary Examiner*—Paul N. Dickson
*Assistant Examiner*—Joseph Rocca
(74) *Attorney, Agent, or Firm*—Posz Law Group, PLC

(57) ABSTRACT

The knee-protecting airbag of the present invention is folded and housed in front of knees of a seated vehicle occupant for protecting the knees, and includes an airbag body and a tether. The airbag body includes an occupant's side wall located toward the occupant upon deployment and a vehicle body side wall located toward the vehicle body. A lower part of the airbag body serves as an upstream, and an upper part of the airbag body serves as a downstream, respectively of flowing-in inflation gas. The tether has a band shape arranged along the transverse direction, and joins the walls, such that passages for gas are formed between the left and right ends of the tether and the left and right edges of the airbag in the inner circumference of the airbag body. The tether includes a gas communication hole. The gas communication hole is so dislocated from the transverse center of the airbag as to face the transverse center of the seated occupant.

5 Claims, 14 Drawing Sheets

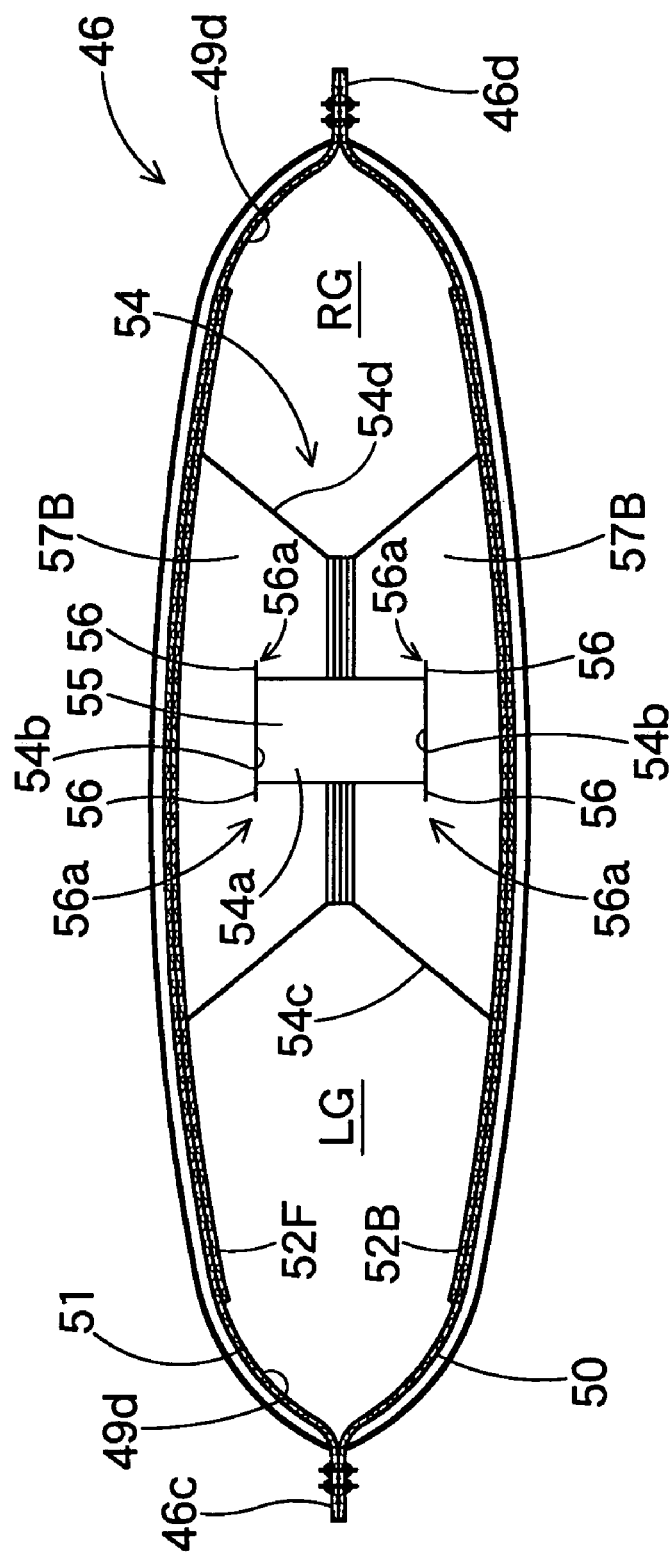

KNEE-PROTECTING AIRBAG

The present application claims priority from Japanese Patent Application No. 2003-273270 of Nakayama, filed on Jul. 11, 2003, and No. 2003-273274 of Nakayama, filed on Jul. 11, 2003, the entireties of which are hereby incorporated into the present application by reference.

BACKGROUND OF THE INVENTION

1. Field of the Invention

The present invention relates to a knee-protecting airbag which is folded and housed in front of knees of a seated occupant, and deploys with inflation gas for protecting the knees in the event of collision of the vehicle.

2. Description of the Related Art

A knee-protecting airbag in the prior art includes a bag-shaped airbag body inflatable with inflation gas and a tether located within the airbag body, as disclosed in JP 2002-337649 A.

The airbag body of this airbag includes a first wall located toward the occupant and a second wall located toward a vehicle body, each upon deployment. The lower part of the airbag body serves as an upstream of flowing-in inflation gas, and the upper part serves as a downstream of inflation gas. The tether joins the occupant's side wall and the vehicle body side wall together for keeping the airbag body substantially flat when inflated.

The tether is band shaped, and arranged along the transverse direction within the airbag body while leaving spaces between its left and right ends and the left and right edges of the airbag in the circumference of the airbag body as passages for inflation gas to flow upward therethrough such that the airbag body is developed widely in the transverse direction in the initial stage of inflation.

Moreover, the tether is provided in the vicinity of its transverse center with a gas communication hole such that inflation gas can flow upward therethrough and the airbag body secures certain extent of cushioning property in a portion right above the tether in the initial stage of inflation.

However, for structural reasons of vehicle, the knee-protecting airbag device sometimes cannot be located right in front of a seated occupant. In that event, the transverse center of the knee-protecting airbag is not placed to face the center of the occupant when deployed.

Moreover, although the knee-protecting airbag is adapted to protect occupant's knees advancing forward, the knees have sometimes been already positioned forward by the time the airbag device is actuated. In that event, the airbag has to be thrust in between a vehicle structural member and the knees smoothly while exerting cushioning property.

Yet another knee-protecting airbag in the prior art disclosed in WO 02/04261 is formed by sewing up the outer edges of an occupant's side base cloth and a vehicle body side base cloth having similar shapes to each other and made of woven fabric. When deployed, the upper edge of this airbag extends substantially straightly along the transverse direction.

Furthermore, an airbag disclosed in JP 52-5126 A which exemplifies a type of airbag formed by sewing up the outer edges of two base cloths of woven fabric has yarn directions of the base cloth dislocated by 45° from each other when overlaying one base cloth on the other, such that the airbag maintains a disc-shape without being twisted or slanted when inflated.

However, the knee-protecting airbag in the prior art has a substantially rectangular plate shape upon deployment, and the lower end of the airbag is fixed to the vehicle body while the upper end is left as a free end. Accordingly, the airbag has to be mounted on the vehicle considering interferences with surrounding members so as not to complete inflation with its upper end twisted or slanted.

Moreover, although the airbag formed by sewing up the outer edges of two base cloths is able to complete inflation without twisting or slanting, this type of airbag is mainly for steering wheel, and is formed by sewing up round base cloths. Accordingly, the arrangement of dislocating yarn directions of base cloths at 45° from each other is hard to apply immediately to a knee-protecting airbag to be inflated in a substantially rectangular plate shape and having a free end.

SUMMARY OF THE INVENTION

The first object of the present invention is to provide a knee-protecting airbag which is capable of protecting knees of an occupant properly in the event that the transverse center of the airbag completely inflated does not conform with the transverse center of an approaching occupant.

The second object of the present invention is to provide a knee-protecting airbag capable of completing inflation without being twisted or slanted.

The first object of the present invention is achieved by the knee-protecting airbag constructed as follows:

The knee-protecting airbag is folded and housed in front of knees of a seated vehicle occupant and deployable for protecting the occupant's knees. The airbag includes an airbag body and a tether. The airbag body includes an occupant's side wall located toward the occupant as the airbag body is completely deployed and a vehicle body side wall located toward the vehicle body. The lower part of the airbag body serves as an upstream, and an upper part of the airbag body serves as a downstream, respectively of flowing-in inflation gas. The tether is located within the airbag body and joins the occupant's side wall and the vehicle body side wall for keeping the airbag body as inflated substantially in a flat shape. The tether is arranged along the transverse direction of the inflated airbag body in a band shape, such that passages for gas are formed between the left and right ends of the tether and the inner circumference of the airbag body. The tether includes a gas communication hole proximate to its transverse center for allowing inflation gas to flow upward therethrough. The gas communication hole is dislocated from the transverse center of the completely inflated airbag, such that the gas communication hole is located to face the transverse center of the seated occupant.

In the knee-protecting airbag thus constructed, the transverse center of the airbag does not conform with the transverse center of the seated occupant. However, since the gas communication hole of the tether is located on the transverse center of the occupant, even if the left and right knees are already positioned forward and close to the inflating airbag, it is prevented that the gas communication hole is closed or narrowed by one of the knees which is close to the transverse center of the airbag. Consequently, an area right above the tether is smoothly provided with inflation gas through the gas communication hole, and deployed in a narrow clearance between a member as part of the vehicle body and the knees while securing cushioning property. Of course, with the gas passages formed in the left and right sides of the tether, an upper part than the tether is developed and inflates widely with inflation gas flowing upward through the passages. The inflation of the portion is further promoted by gas passing through the gas communication hole, so that the knees having approached the airbag are properly protected.

In comparison with this, if the gas communication hole is located to fall on the transverse center of the airbag, an occupant seated out of the transverse center of the airbag is liable to close the gas communication hole with his left or right knee approaching the center of the airbag, so that the airbag has difficulties in providing inflation gas to the portion right above the tether, and in securing cushioning property in the portion.

In the knee-protecting airbag constructed as above, therefore, the knees of an occupant are securely protected even if the transverse center of the completely inflated airbag does not conform with the transverse center of an occupant approaching the airbag.

If the gas communication hole of the above-mentioned tether is located in the transverse center of the tether, following working-effects are obtained. That is, the airbag, during inflation, allows inflation gas to flow upward via three positions, i.e., the gas communication hole and the gas passages in the left and right sides of the tether, all of which are located symmetrical relative to the transverse center of the occupant. Accordingly, even if both knees are in positions contactable with the occupant's side base cloth of the unfolding airbag in the course of inflation of the airbag, since distances from each of the knees to the gas communication hole or the gas passages are equal, the airbag is able to give equal pressure of inflation gas to the knees and complete inflation.

When a plurality of tethers are located in the above knee-protecting airbag, it is desired that at least a tether located lowermost as the airbag is completely inflated includes the gas communication hole.

In the knee-protecting airbag thus constructed, an airbag body is securely kept in a flat shape upon deployment, since the tethers are juxtaposed along the vertical direction within the airbag body. Even with a plurality of tethers, since the gas communication hole is formed in the tether located lowermost upon airbag deployment (or in the upstream), an area right above the tether is smoothly provided with inflation gas through the gas communication hole, and deployed in a narrow clearance between a member as part of the vehicle body and the knees while securing cushioning property. Of course, the upper tethers may be provided with gas communication holes.

In the above-mentioned knee-protecting airbags, it is desired that the tether is constituted by two pieces of cloth members each of the which is stitched at one end side to either the occupant's side wall or the vehicle body side wall, and is stitched up together with the other cloth member at the other end side, and that each of the cloth members includes a cut-out portion for forming the gas communication hole, which is formed by cutting out a part of the end side stitched up together with the counterpart.

In the knee-protecting airbag thus constructed, since the tether is formed by two pieces of cloth members each of whose one end is stitched to either the occupant's side wall or the vehicle body side wall and the other end is stitched up together with the other cloth member, the stitching work of the tether to the base cloths in manufacturing the airbag is facilitated, so that the manufacturing processes of the airbag and its cost are reduced.

Moreover, in the above-mentioned knee-protecting airbags, it is desired that stitching portions for stitching up the two cloth members of the tether are formed linearly and substantially along the transverse direction in the left and right sides of the cut-out portion, and that there are notches in the inner circumference of the cut-out portion such that a leading end of each of the notches is located inside of the tether than the end of each of the stitching portions.

In the knee-protecting airbag thus constructed, if a tension force is applied to the tether along with the inflation of the airbag, in the inner circumference of the cut-out portion, stress concentrates on an area around the leading end of each of the notches. In each of the stitching portions where the cloth members are stitched up together, a point where an extension from the leading end of the notch along the direction of the tension force, i.e., a line perpendicular to the stitching portion, and the stitching portion intersect usually receives a greatest force. In the present invention, however, since the leading end of each of the notches is located inward of the tether than the end of the stitching portion and apart from the cut-out portion, in the stitching portion, the greatest force is applied to a point inward than the end. Accordingly, when a tension force is applied to the tether, less force is applied to the vicinity of the ends of the stitching portions, and stress concentration on the stitching yarn in the vicinity of the ends of the stitching portions is reduced, so that stitching strength of the cloth members of the tether is improved even when the tether includes a cut-out portion to form the gas communication hole.

The second object of the present invention is achieved by the knee-protecting airbag constructed as follows:

The knee-protecting airbag is folded and housed in front of knees of a seated vehicle occupant and deployable for protecting the occupant's knees. The airbag has a substantially rectangular plate shape as completely deployed, with its lower end fixed to the vehicle body and the upper end acting as free end. The airbag is formed by joining outer edges of an occupant's side base cloth and a vehicle body side base cloth both made of woven fabric and having substantially the same shapes, and the upper edge of the airbag as completely deployed extends substantially straightly along the transverse direction. Either warps or wefts of the woven fabric constituting either one of the occupant's side base cloth or the vehicle body side base cloth are arranged substantially along the transverse direction substantially along the upper edge of the airbag as completely deployed, while either warps or wefts of the woven fabric constituting the other base cloth are arranged to intersect with the upper edge of the airbag as completely deployed substantially at 45°.

In the knee-protecting airbag thus constructed, either warps or wefts of either the occupant's side base cloth or vehicle body side base cloth are arranged substantially parallel to the upper edge of the airbag body that extends substantially straightly along the transverse direction upon airbag deployment. Accordingly, the occupant's side base cloth or vehicle body side base cloth whose yarn direction is substantially parallel to the upper edge of the airbag (as will be called a parallel base cloth) is hardly twisted or deformed to slant. On the other hand, warps or wefts in the other vehicle body side base cloth or occupant's side base cloth (as will be called an intersecting base cloth) having a substantially rectangular shape are arranged to intersect with the upper edge of the airbag at an intersection angle of about 45°, which is bias to the yarn direction of the parallel base cloth. Therefore, the intersecting base cloth is easy to stretch without affecting the outer edge of the parallel base cloth. Consequently, when the knee-protecting airbag deploys with its lower end fixed and leaving its upper end as free end, the upper edge part of the occupant's base cloth and the vehicle body side base cloth is able to develop and inflate substantially along the transverse direction without being twisted or slanted. Along with the upper edge, the upper and lower parts of the airbag continued from the upper edge are also able to develop and inflate without being twisted or slanted.

Therefore, the knee-protecting airbag constructed as above is able to complete inflation without being twisted or slanted.

If the base cloth whose warps or wefts intersect with the upper edge of the airbag at about 45° is the occupant's side base cloth, its warps and wefts intersect with each of sides of its substantially rectangular shape on the bias, which makes the occupant's side base cloth more stretchable. To the contrary, the vehicle body side base cloth is hard to stretch since its warps and wefts are parallel to each of sides of its substantially rectangular shape. In other words, since the occupant's side base cloth stretches while the vehicle body side base cloth does not upon airbag deployment, the occupant's side base cloth becomes likely to bulge than the vehicle body side base cloth, which makes it easier for the vehicle body side base cloth to be proximate to the vehicle body. As a result, the airbag becomes more likely to deploy upward along the vehicle structural member without unnecessarily protruding toward occupant's knees, so that the inflating airbag is able to enter and deploy easily in a narrow clearance between the occupant's knees and the vehicle structural member located forward of the knees.

To the contrary, the base cloth whose warps or wefts intersect with the upper edge of the airbag at about 45° may be the vehicle body side base cloth.

BRIEF DESCRIPTION OF DRAWINGS

FIG. 7 is a cross section of the airbag of FIG. 5, taken along line VII-VII in FIG. 5;

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
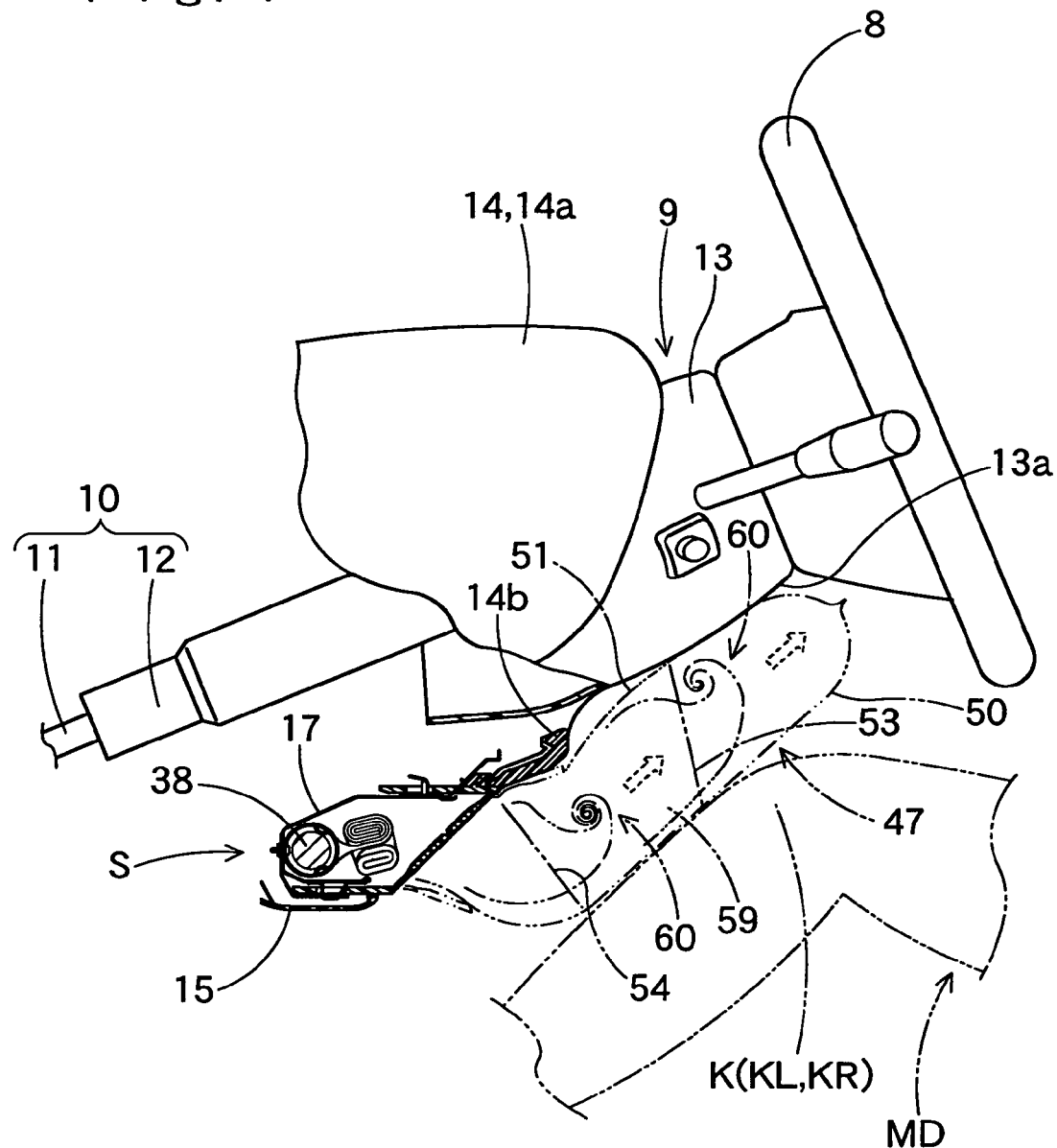
FIG. 1 is a schematic vertical section of a knee-protecting airbag device in which an embodiment of the airbag according to the present invention is used in service, taken along the front-rear direction of the vehicle.
Figure 4:
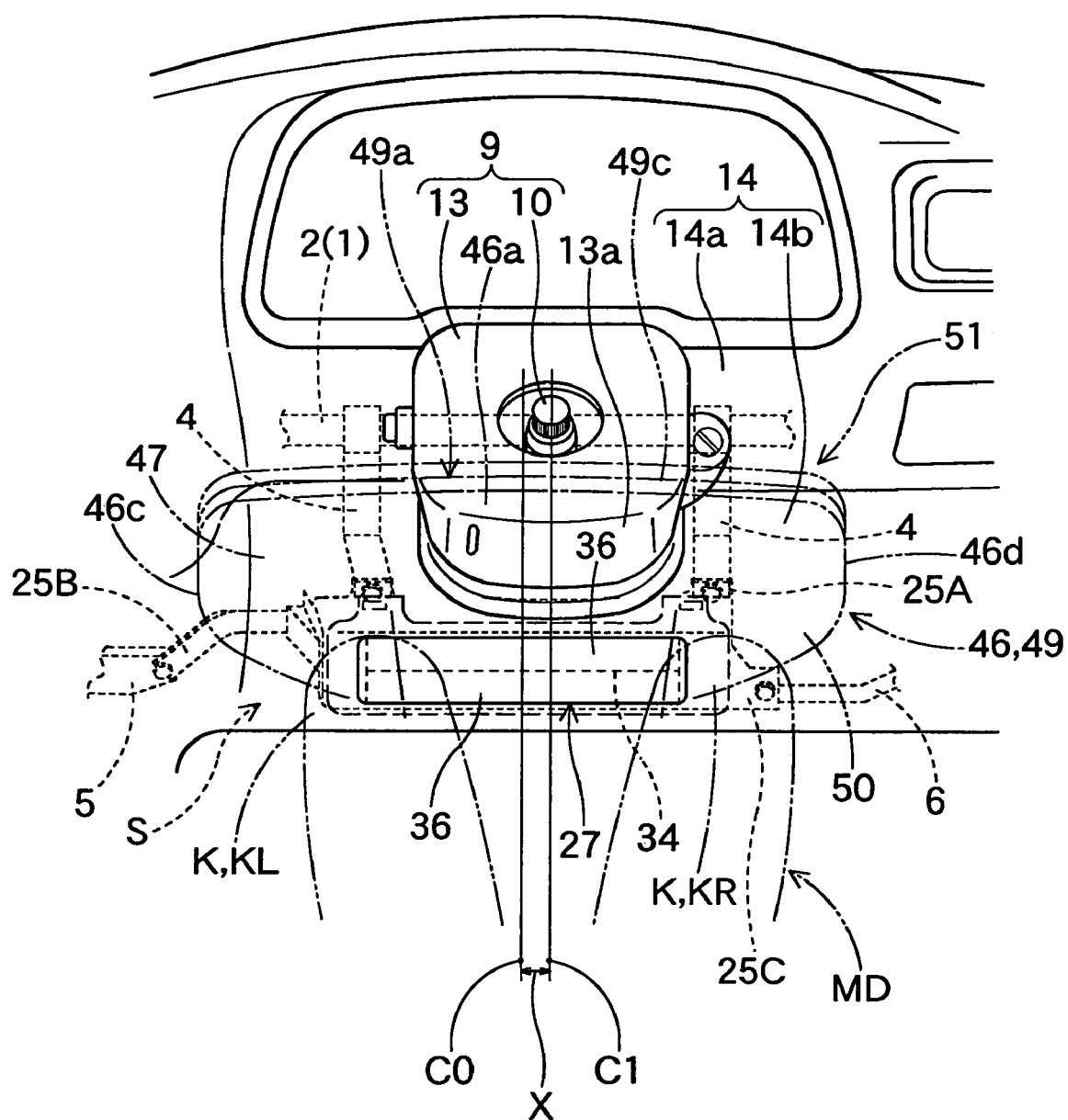
FIG. 4 is a schematic front view of the knee-protecting airbag device of FIG. 1.

The knee-protecting airbag 46 to achieve the first and second objects of the present invention is used in a knee-protecting airbag device S. As shown in FIGS. 1 and 4, the knee-protecting airbag device S is located below the steering column 9 and in front of a driver MD as an occupant for protecting knees K (KL and KR) of the driver MD.

Up-down, front-rear, and left-right in this specification are based on a state in which the airbag device S is mounted on the vehicle, and therefore, correspond to up-down, front-rear, and left-right of the vehicle with the airbag device mounted thereon.

As shown in FIG. 4, in the illustrated embodiment, the airbag device S is located a little to the left below the steering column 9 as part of the vehicle body 1, so that the transverse center C0 of the inflated airbag 46 is dislocated leftward from the transverse center C1 of the seated driver MD by a distance X.

Referring to FIG. 1, the steering column 9 includes a column body 10 connected to the steering wheel 8 and a column cover 13 for covering the column body 10 below the steering wheel 8. The column body 10 includes a main shaft 11 and a column tube 12 for covering the main shaft 11.

The column cover 13 is made of synthetic resin into a substantially square cylindrical shape, and is so located along the axial direction of the column body 10 as to cover the column body 10. The rear side 13a of the column cover 13 protruded from an instrument panel (as will be called "dashboard" herein below) 14 is formed into a substantially curved rectangular shape and ascends obliquely backward.

The knee-protecting airbag device S includes a folded airbag 46, an inflator 38 for supplying the airbag 46 with inflation gas, a housing 17 opened rearward for housing the folded airbag 46 and the inflator 38, and an airbag cover 27 for covering rearward of an opening 18a of the housing 17.

Figure 2:
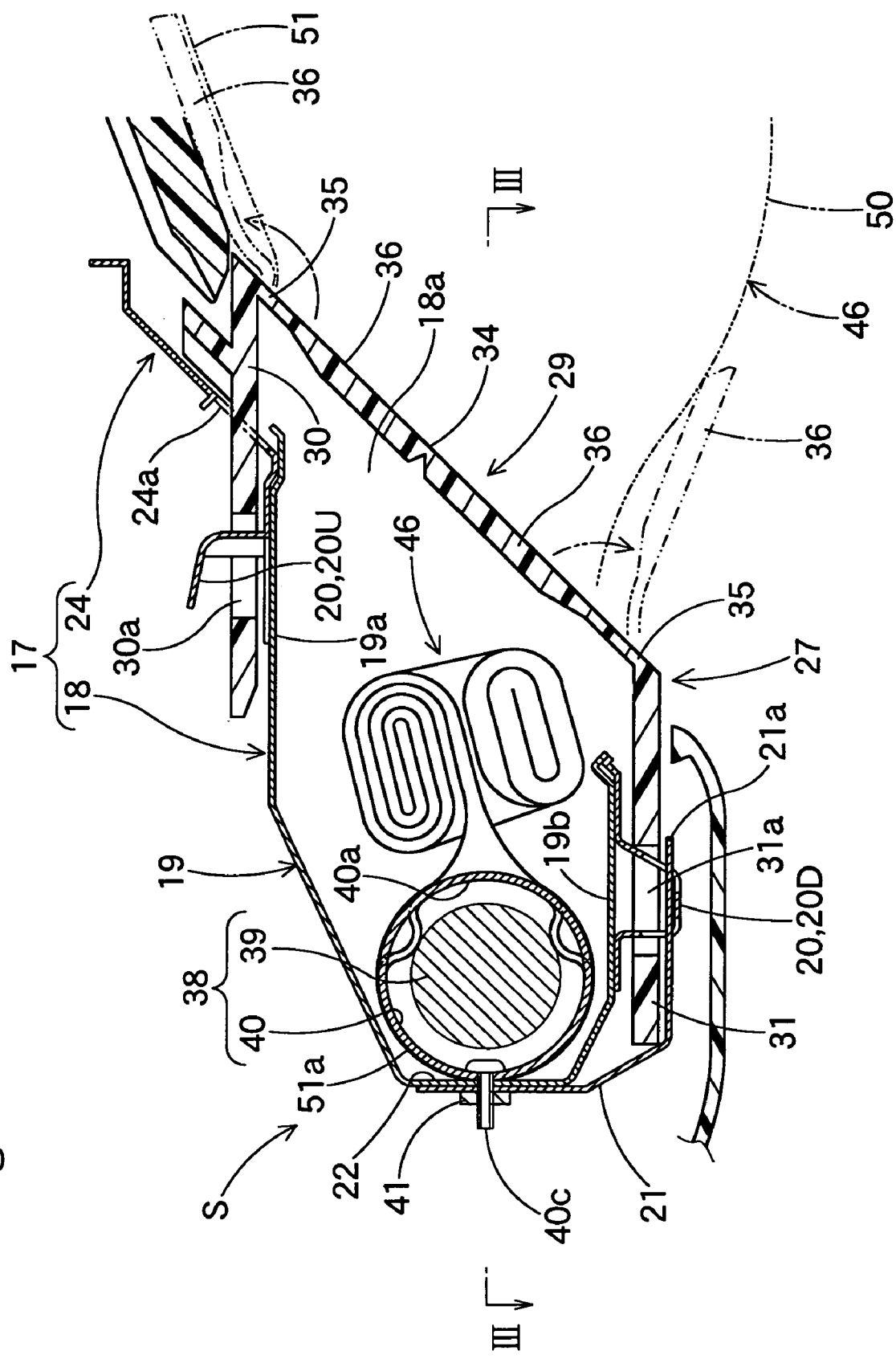
FIG. 2 is a schematic enlarged vertical section of the knee-protecting airbag device of FIG. 1, taken along the front-rear direction of the vehicle.
Figure 3:
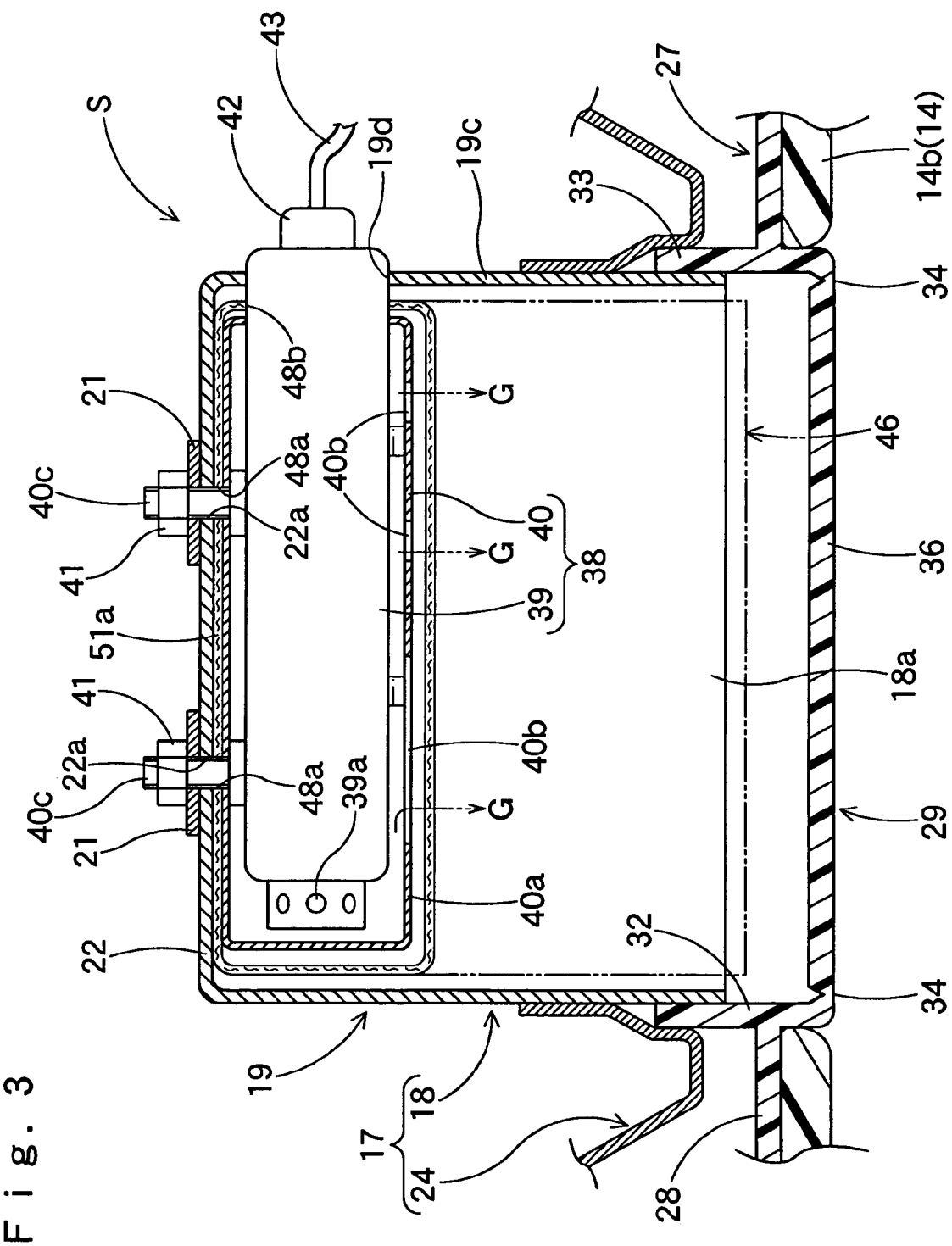
FIG. 3 is a schematic enlarged cross section of the knee-protecting airbag device of FIG. 1 taken along the front-rear direction of the vehicle, and corresponds to line III-III in FIG. 2.

The housing 17 is made of sheet metal. Referring to FIGS. 2 to 4, the housing 17 is located below the steering column 9, and includes a box-shaped main body 18 and a panel portion 24 extending outwardly from the rear end of the main body 18. The main body 18 includes a substantially square cylindrical circumferential wall portion 19, a bottom wall 22 for closing front side of the circumferential wall portion 19 and a substantially rectangular opening 18a located at rear side. The circumferential wall portion 19 is provided, on outer surfaces of its walls 19a and 19b confronting each other in the vertical direction, with a plurality of retainers 20 (20U and 20D) for attaching later-described upper and lower joint walls 30 and 31 of the airbag cover 27 to the housing 17.

Each of the retainers 20U formed on the outer surface of the upper wall 19a has an inverted L-shaped section, and is adapted to be inserted in a retaining hole 30a in the upper side wall 30 of the airbag cover 27, and retain the edges of the retaining holes 30a like a hook. The retaining hooks 20U are located in the wall 19a in plurality along the vehicle's transverse direction.

Each of the retainers 20D formed on the outer surface of the lower wall 19b is a projection having a substantially U-shaped section, and is adapted to be inserted in a retaining hole 31a in the lower side wall 31 of the airbag cover 27. The retainers 20D are also located in the wall 19b in plurality along the vehicle's transverse direction. A locking member 21 is inserted into each of the retaining projections 20D for preventing the projections 20D from coming off from the retaining holes 31a after being put in the retaining holes 31a. The locking member 21 includes a plurality of insert portions 21a to be inserted respectively in between the outer surface of the lower side wall 31 and inner circumference of each of the retaining projections 20D. These insert portions 21a converge into one at the front and is coupled there to the housing 17. More specifically, the locking member 21 is fixed to the bottom wall 22 of the housing 17 together when the inflator 38 is attached to the housing 17 by bolts 40c and nuts 41, as best shown in FIG. 2.

Referring to FIG. 3, the circumferential wall portion 19 is further provided on one of its side walls 19c with an insert hole 19d for inserting the main body 39 of the inflator 38 therethrough. The bottom wall 22 is provided with two insert holes 22a for inserting individual bolts 40c of the inflator 38 thereinto.

The panel portion 24 is formed to encircle the opening 18a of the housing 17. As shown in FIG. 4, the panel portion 24 includes joint portions 25 (25A, 25B and 25C) for securing the housing 17 to the vehicle body 1. The vehicle body 1 includes brackets 4, 5 and 6 for receiving the joint portions 25, respectively. The brackets 4 to which the joint portions 25A located in the upper side are joined are connected to a dashboard reinforcement 2 as part of the vehicle body 1. The brackets 5 and 6 to which the joint portions 25B and 25C located in the lower side are joined respectively are connected to unillustrated center brace and front body pillar or the like as part of the vehicle body 1, respectively. The panel portion 24 further includes a slit 24a for inserting the upper side wall 30 of the airbag cover 27 thereinto, as shown in FIG. 2.

The airbag cover 27 is formed of thermo-plastic elastomer of polyolefin or the like, and is so attached to the housing 17 as to cover the rearward of the opening 18a of the housing 17. The airbag cover 27 is located in part of a lower panel 14b of the dashboard 14 which is composed of an upper panel 14a and the lower panel 14b, and includes a door portion 29 and a general portion 28 located around the door portion 29.

The door portion 29 is contiguous with the lower panel 14b, as shown in FIG. 3. In the illustrated embodiment, the door portion 29 and the lower panel 14b are substantially flush in their rear surfaces. The door portion 29 includes a pair of doors 36, and each one upper, lower, left and right side wall 30, 31, 32 and 33 that are located around the doors 36.

The pair of doors 36 is formed into a substantially rectangular plate shape slightly larger than the opening 18a of the housing 17, and covers the opening 18a. The doors 36 open in the vertical direction as shown in FIG. 3. Each of the doors 36 is provided at the upper or lower end with a hinge line 35 for the door to open around, and is provided in a substantially H-shaped portion around the doors 36 as viewed from rearward with a thin breakable portion 34.

The upper side wall 30, the lower side wall 31, the left side wall 32 and the right side wall 33 are protruded forward to neighbor the circumferential wall portion 19 of the housing main body 18 from outside. In the illustrated embodiment, the upper side wall 30 located close to the upper wall 19a of the circumferential wall portion 19 and the lower side wall 31 located close to the lower wall 19b serve as joint walls for attaching the airbag cover 27 to the housing 17. The upper wall 30 is provided with retaining holes 30a for retaining the retainers 20U, and the lower wall 31 is provided with retaining holes 31a for retaining the retainers 20D.

As shown in FIGS. 2 and 3, the general portion 28 is so recessed forward from the door portion 29 by the thickness of the lower panel 14b as not to interfere with the lower panel 14b located around the door portion 29. The lower panel 14b and the general portion 28 are fixed together at not-shown predetermined positions by clips or the like.

Referring to FIGS. 2 and 3, the inflator 38 is a cylinder-shaped type which locates its axial direction along the vehicle's transverse direction, and includes a substantially cylindrical body 39 and a diffuser 40. The inflator body 39 is provided at its one end with a plurality of gas discharge ports 39a. The other end is connected with a connector 42 for inputting actuating signals via a lead wire 43. The diffuser 40 includes a holding cylinder 40a of sheet metal for covering the inflator body 39 and a plurality of (two, in the illustrated embodiment) bolts 40c protruded from the holding cylinder 40a. The holding cylinder 40a is provided in its rear side face as mounted on the vehicle with a plurality of gas outlet ports 40b for emitting inflation gas G discharged from the gas discharge ports 39a.

The inflator 38 is actuated by an actuating signal inputted through the lead wire 43 when an airbag actuating circuit mounted on the vehicle detects a frontal collision of the vehicle. At this time, an unillustrated airbag device mounted on the steering wheel 8 is actuated simultaneously.

Figure 5:
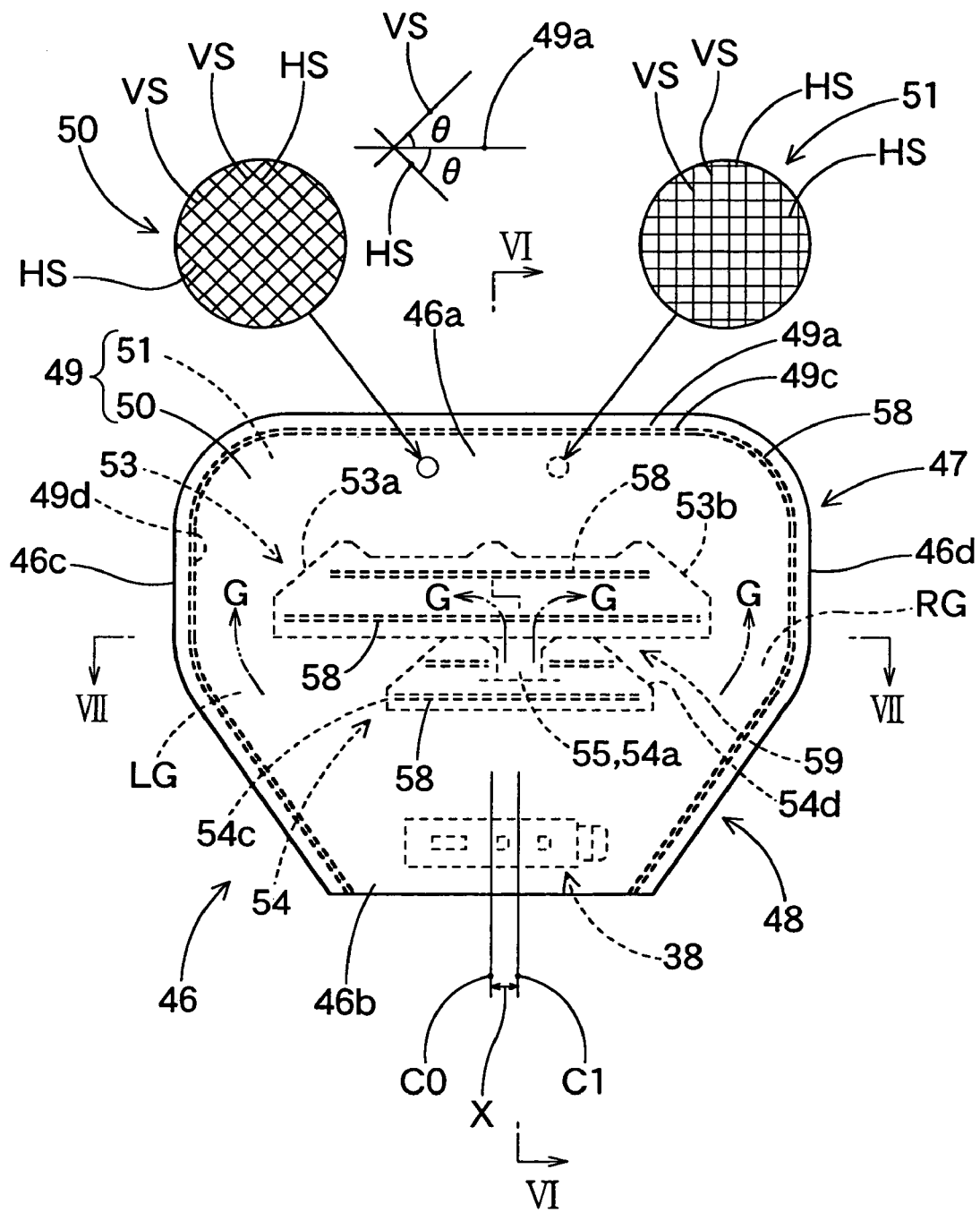
FIG. 5 is a front view of an airbag used in the airbag device of FIG. 1 locating an inflator therein, and shows tethers.
Figure 6:
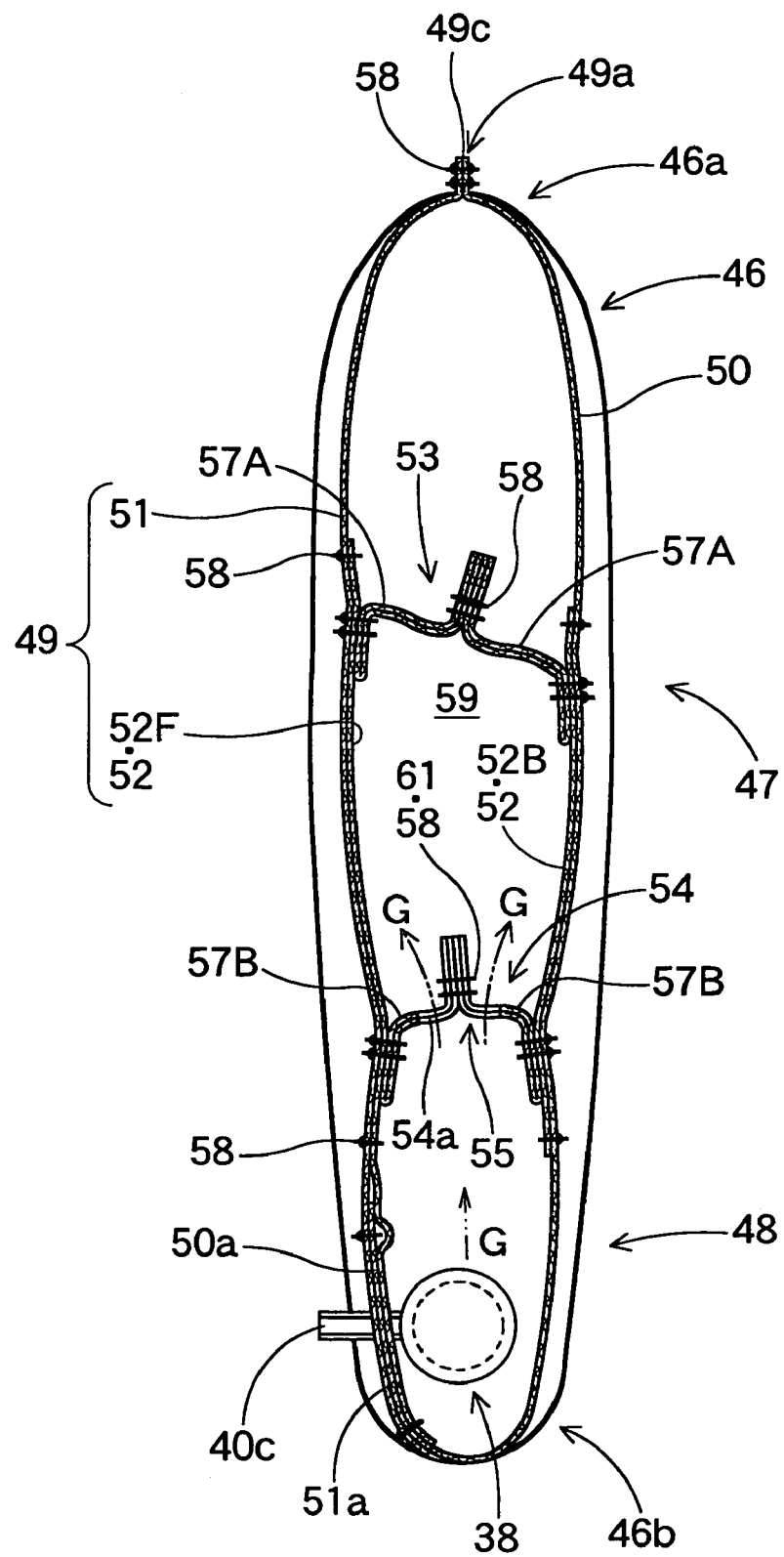
FIG. 6 is a vertical section of the airbag of FIG. 5 taken along line VI-VI in FIG. 5.

The airbag 46 includes an airbag body 49 inflatable when fed with inflation gas G, and two tethers 53 and 54 located in up and down rows within the airbag body 49. When the airbag body 49 is inflated, the tethers 53 and 54 are adapted to keep the inflated airbag body 49 in a flat shape by exerting tension. The airbag 46 takes a substantially rectangular plate shape when deployed completely, as shown in FIGS. 1, 4 and 5, and includes an upstream portion 48 which is located toward the lower end 46b of the airbag 46 and accommodates the inflator 38, and a downstream portion 47 which is located toward the upper end 46a of the airbag 46 and has a greater transverse width than the upstream portion 48. The upstream portion 48 is located upstream, while the downstream portion 47 is located downstream in the stream of inflation gas G. A portion of the upstream portion 48 in the vicinity of a later-described vehicle body side base cloth 51 serves as a mounting portion 51a to be attached to the housing body 18 utilizing the inflator 38. The mounting portion 51a remains accommodated within the housing body 18 when the airbag 46 is completely deployed. As shown in FIGS. 3 and 8, this portion 51a of the upstream portion 48 includes two insert holes 48a and an insert hole 48b. The insert holes 48a are for inserting the individual bolts 40c of the inflator 38 therethrough, and the insert hole 48b is for inserting the body 39 of the inflator 38 therethrough. The airbag 46 is attached at the mounting portion 51a to the housing body 18 with the inflator body 39 protruded from the insert hole 48b, and with the edges of the individual insert holes 48a clamped by the holding cylinder 40a of the diffuser 40 and the bottom wall 22 of the housing body 18. Accordingly, in the airbag 46, the lower end 46b is a fixed end while the upper end 46a acts as a free end when deployed.

As shown in FIGS. 5 to 8, the bag-shaped airbag body 49 is formed by joining outer edges of two base cloths (walls) 50 and 51 both of which are made of flexible woven fabric of polyester, polyamide or the like, and includes reinforcing patches 52 (52F and 52B) in predetermined positions. One of the two base cloths (walls) 50 and 51 constituting the airbag body 49 is an occupant's side base cloth (occupant's side wall) 50 located toward the driver MD upon airbag deployment, while the other is a vehicle body side base cloth (vehicle body side wall) 51 located toward the column cover 13 upon airbag deployment. The occupant's side base cloth 50 and the vehicle body side base cloth 51 have substantially rectangular shapes similar to each other.

Strictly speaking, the occupant's side base cloth 50 does not have the same shape as the vehicle body side base cloth 51 since the occupant's side base cloth 50 is provided with a strengthening portion 50a for strengthening the mounting portion 51a where the inflator 38 is located. However, in the upper edge part 49a of the airbag body 49, a joint portion 49c of the base cloths 50 and 51 are arranged straightly in transverse direction, and the base cloths 50 and 51 are symmetric in the front-rear direction relative to joint portion 49c.

Figure 8A:
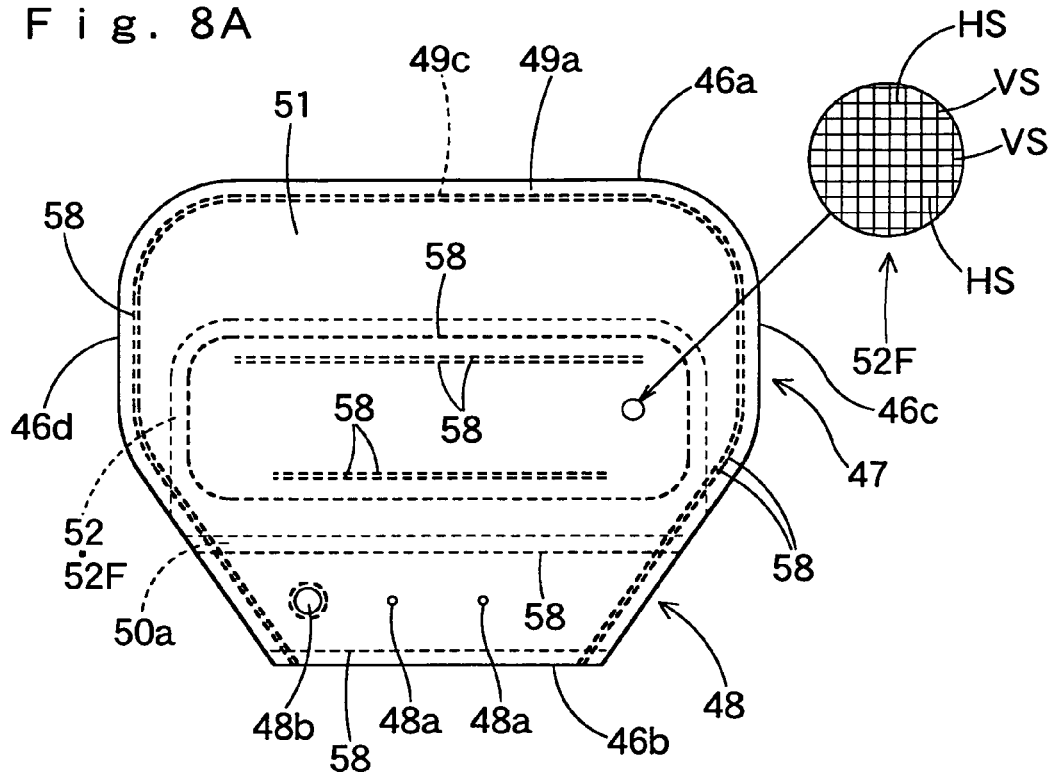
FIGS. 8A and 8B are a front view and a rear view of the airbag of FIG. 5, respectively, and show reinforcing patches.
Figure 8B:
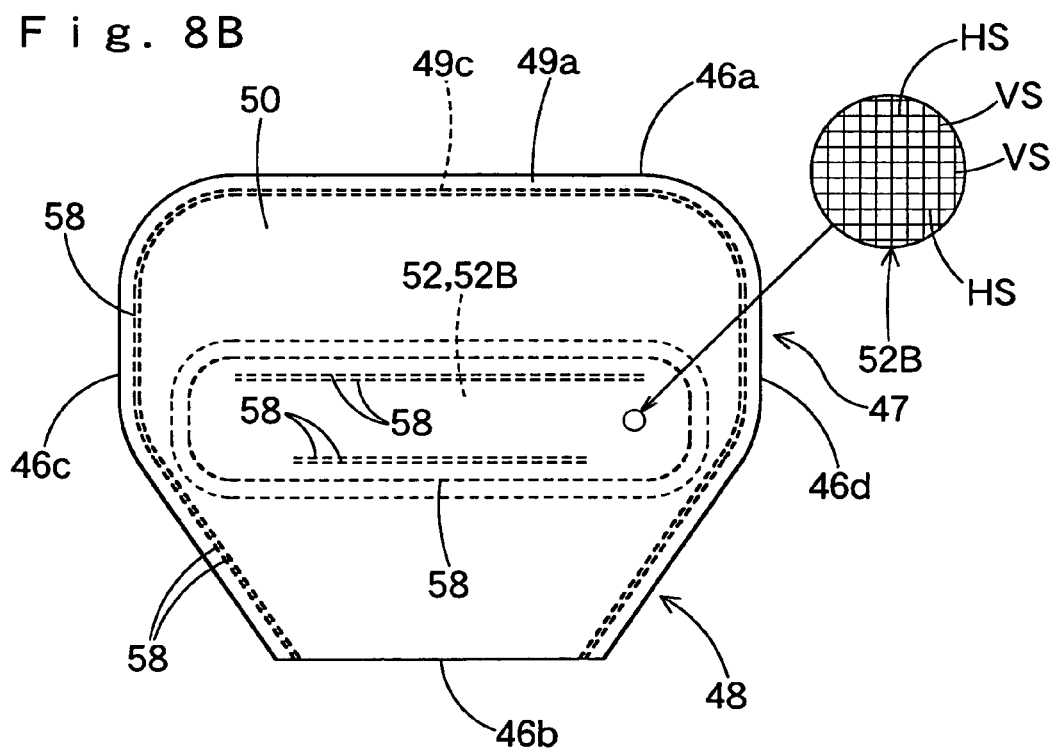

As best shown in FIG. 8A, the reinforcing patch 52F is joined in an area in the inner surface of the vehicle body side base cloth 51 which ranges from the locations of the tethers 53 and 54 to the lower end 46b of the airbag 46 including the upper stream portion 48, and reaches the left and right edges of the base cloth 51. As shown in FIG. 8B, the reinforcing patch 52B is joined to the inner surface of the occupant's side base cloth 50 in a substantially rectangular area around the locations of the tethers 53 and 54 and apart from the outer edge of the base cloth 50.

The insert holes 48a and 48b in the upper stream portion 48 are formed through the vehicle body side base cloth 51, the strengthening portion 50a extending from the occupant's side base cloth 50, and the reinforcing patch 52F.

As the base cloths 50 and 51, the reinforcing patches 52F and 52B and later-described cloth members 57A and 57B for forming the tethers 53 and 54 are also made of flexible fabric woven of warps VS and wefts HS of polyester, polyamide or the like.

The upper edge 49a of the airbag body 49 as completely inflated is arranged straightly along the transverse direction. Regarding yarn directions of warps VS or wefts HS of the base cloths 50 and 51, in the vehicle body side base cloth 51, the yarn direction of warps VS or wefts HS (wefts HS, in the illustrated embodiment) is parallel to the upper edge 49a of the airbag body 49, as the airbag body 49 is completely inflated, and in the occupant's side base cloth 50, the yarn direction of warps VS or wefts HS intersects with the upper edge 49a at an intersection angle è of 45°. The vehicle body side base cloth 51 in this case will be called a parallel base cloth, while the occupant's side base cloth 50 will be called an intersecting base cloth hereinbelow.

Moreover, when the airbag body 49 is completely inflated, the yarn direction of warps VS or wefts HS (wefts HS, in the illustrated embodiment) of the reinforcing patches 52F and 52B is parallel to the upper edge 49a of the airbag body 49, while the yarn direction of warps VS or wefts HS of the cloth members 57A and 57B intersects with the upper edge 49a at 45°.

Although the joining of the base cloths 50 and 51, the reinforcing patches 52F and 52B, and the cloth members 57A and 57B of the tethers 53 and 54 is done by stitching with sewing yarn 58, the joining may also be done by adhesion, welding or the like.

The tethers 53 and 54 are located in an area of the downstream portion 47 within the airbag body 49 for defining the distance between the occupant's side base cloth 50 and the vehicle body side base cloth 51 upon deployment of the airbag 46, such that the downstream portion 47 smoothly goes into the clearance between the knees K of the driver MD and the column cover 13. The tethers 53 and 54 have respectively a band shape, and are arranged in up and down rows along the transverse direction.

Each of the tethers 53 and 54 is made of two pieces of cloth members 57A or 57B. More specifically, each of two cloth members 57A is connected at one end to either one of the base cloth 50 or 51 and joined at the other end to its counterpart, and thus the tether 53 is formed. Each of two cloth members 57B is connected at one end to either one of the base cloth 50 or 51 and joined at the other end to its counterpart, and thus the tether 54 is formed.

In the illustrated embodiment, each of the cloth members 57A and 57B is used in a folded and two-ply state, and is formed into a trapezoidal shape enlarging toward the base cloth 50 or 51.

Each of the tethers 53 and 54 locates its transverse ends 53a and 53b, or 54c and 54d remote from the inner circumference 49d of the airbag body 49 (left and right edges 46c and 46d of the airbag 46), which provides gas passages LG and RG respectively between the transverse ends 53a, 53b, 54c and 54d and the inner circumference 49d of the airbag body 49 for inflation gas G to flow upward therethrough.

Moreover, as shown in FIGS. 5 to 7 and 9, the lower tether 54 located toward the upstream portion 48 is provided with a gas communication hole 55 for allowing inflation gas G to pass therethrough. The communication hole 55 is formed in the ends of the two cloth members 57B close to each other in a substantially rectangular cut-out shape. In the illustrated embodiment, the gas communication hole 55 is composed by cut-out portions 54a each of which is formed by cutting out the edge of each of the cloth members 57B in a substantially rectangular shape.

The gas communication hole 55 is located to the right from the transverse center C0 of the airbag 46 as completely inflated, so as to conform with the transverse center C1 of a seated driver MD, or the transverse centers of the column cover 13, the steering column 9, or a seat in which the driver MD as an occupant is seated.

Figure 9:
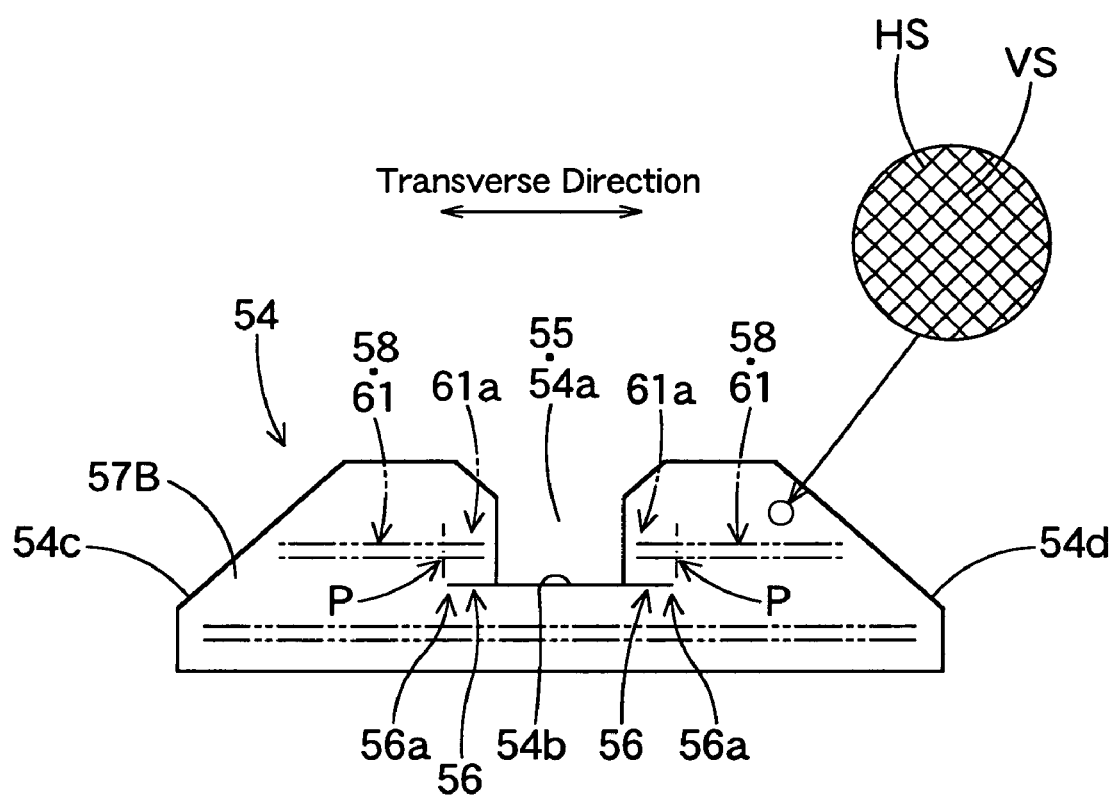
FIG. 9 is a front view of a cloth member for constituting a lower tether of the airbag of FIG. 5.

As shown in FIGS. 7 and 9, the cut-out portion 54a is provided in the transverse edges in its inner circumference 54b with notches 56 which is so notched to be located inside the tether 54. In the illustrated embodiment, the notches 56 are formed in the inner circumference 54b close to the ends in the front-rear direction of the cut-out portions 54a, as viewed from above.

Moreover, the gas communication hole 55 is located in the transverse center of the tether 54. That is, the distance from the left end 54c of the tether 54 to the left edge 46c of the airbag 46 is predetermined greater than the distance from the right end 54d of the tether 54 to the right edge 46d of the airbag 46.

To manufacture the airbag 46, the strengthening portion 50a extending from the occupant's side base cloth 50 is overlaid on the mounting portion 51a of the vehicle body side base cloth 51, and stitched thereto by stitching yarn 58. The reinforcing patch 52F is put on the mounting portion 51a while the reinforcing patch 52B is put on the occupant's side base cloth 50, and each of which is stitched there to by stitching yarn 58. Subsequently, the cloth members 57B are stitched to the base cloths 50 and 51, and stitched up together to form the tether 54, and then the cloth members 57A are stitched to the base cloths 50 and 51, and stitched up together to form the tether 53. Then if the outer edges of the base cloths 50 and 51 are stitched up together, the airbag 46 is complete.

The inflator 38 is located within the airbag 46 with the bolts 40c and the end of the inflator body 39 projected from the individual insert holes 48a and 48b before the outer edges of the base cloths 50 and 51 are sewn up.

Figure 10A:
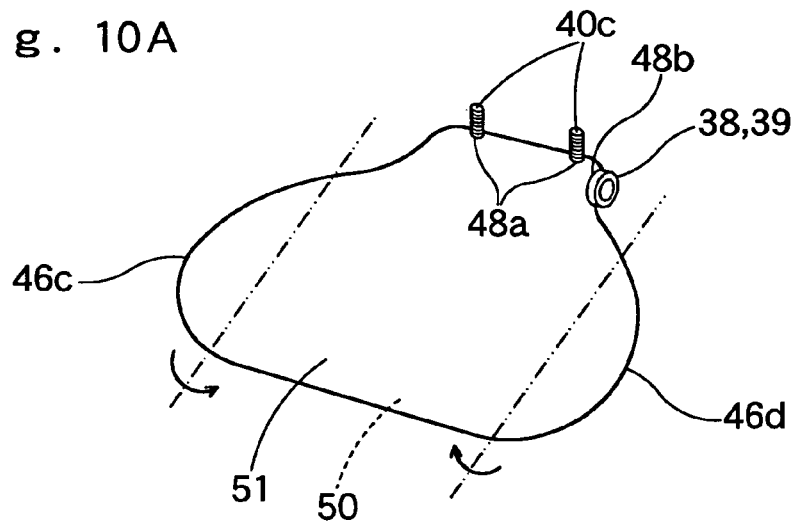
FIGS. 10A to 10D illustrate a folding process of the airbag of FIG. 5.
Figure 10B:
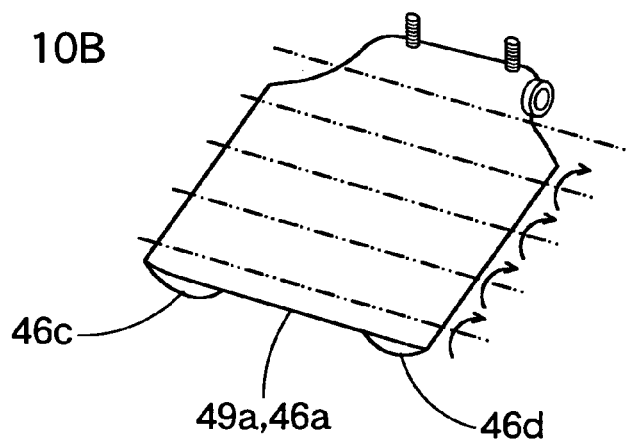
Figure 10C:
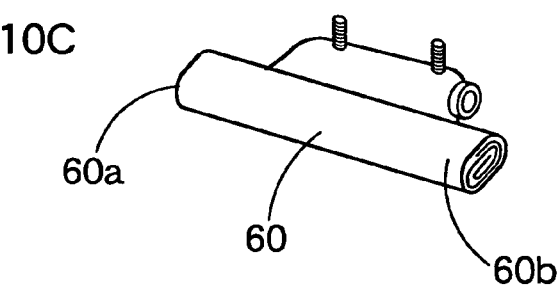
Figure 10D:
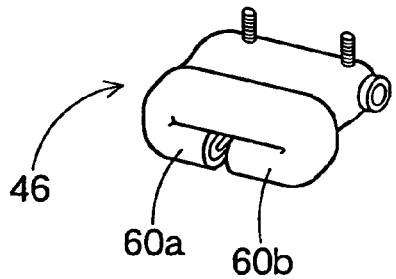

To mount the airbag device S on the vehicle, the airbag 46 thus manufactured is folded up firstly. More specifically, as shown in FIG. 10A, from a state in which the occupant's side base cloth 50 and the vehicle body side base cloth 51 are flatly overlaid on each other, the left and right edges 46c and 46d are folded on the occupant's side base cloth 50. Subsequently, as shown in FIGS. 10B and 10C, the airbag 46 is roll-folded on the vehicle body side base cloth 51 from the upper end 46a side on folds along transverse direction, and then as shown in FIG. 10D, the left and right edges 60a and 60b of the roll-folded portion 60 are folded on the occupant's side base cloth 50 such that the airbag 46 has a transverse width fittable in the housing body 18, and thus the folding of the airbag 46 is completed. Thereafter, an unillustrated breakable wrapping member is wrapped around the airbag 46 for keeping the folded-up shape. At this time, the bolts 40c of the inflator 38 and the end of the inflator body 39 protruded from the insert holes 48a and 48b are taken out from the wrapping member.

Subsequently, the inflator 38 is housed in the housing body 18 together with the folded airbag 46 so that the individual bolts 40c of the inflator 38 are protruded from the insert holes 22a while the end of the inflator body 39 is protruded from the insert hole 19d.

Thereafter, the airbag cover 27 is attached to the housing 17. Firstly, the upper side wall 30 is inserted into the slit 24a of the panel portion 24, and the individual retaining hooks 20U are so inserted into the retaining holes 30a as to be retained by edges of the retaining holes 30a on the top surface of the upper side wall 30. Subsequently, the individual retaining projections 20D are inserted into the retaining holes 31a in the lower sidewall 31, and the insert portions 21a of the locking member 21 are inserted between the outer surface of the lower side wall 31 and the inner circumference of the individual projections 20D. Then if the individual bolts 40c are put through the locking member 21 and the nuts 41 are fastened with the bolts 40c, the airbag cover 27 is attached to the housing 17.

Thereafter, the individual joint portions 25 of the housing 17 are secured to the vehicle body 1 utilizing the brackets 4, 5 and 6, while the connector 42 having the lead wire 43 joined thereto is connected to the inflator body 39. If the dashboard 14 and an under cover 15, as shown in FIGS. 1 and 2 are then attached, the airbag device S is mounted on the vehicle.

After the airbag device S is mounted on the vehicle, if an actuating signal is inputted to the inflator body 39 via the lead wire 43, inflation gas G is discharged from the gas discharge ports 39a of the inflator 38, and the gas then flows into the airbag 46 via the gas outlet ports 40b of the diffuser 40. Then the airbag 46 inflates and breaks the wrapping film, pushes the doors 36 of the airbag cover 27, and breaks the breakable portion 34 to open the doors 36 vertically around the hinge lines 35, and thus the airbag 46 deploys as indicated by double-dotted lines in FIGS. 1 and 4.

Figure 11:
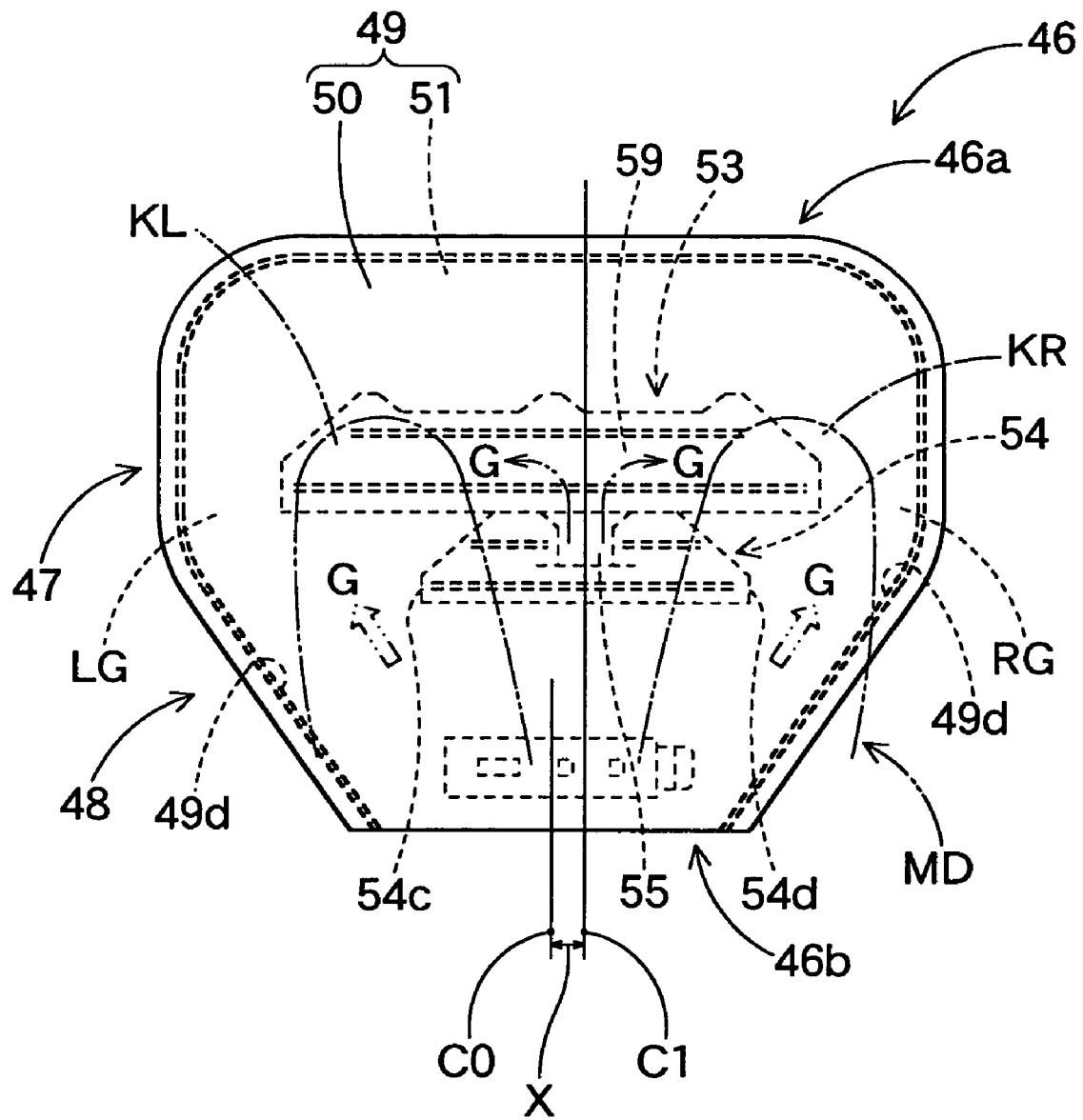
FIG. 11 illustrates a stream of gas upon inflation of the airbag of FIG. 5.

When the airbag 46 is deployed, the transverse center C0 of the airbag 46 does not conform with the transverse center C1 of the seated driver MD, as shown in FIG. 11. However, since the gas communication hole 55 of the tether 54 is located on the transverse center C1 of the driver MD, even if the left and right knees KL and KR are already positioned forward and close to the inflating airbag 46, it is prevented that the gas communication hole 55 is closed or narrowed by the left knee KL which is close to the transverse center C0 of the airbag 46.

Consequently, an area 59 between the tether 54 and 53 right above the tether 54 is smoothly provided with inflation gas G through the gas communication hole 55, and the downstream portion 47 of the airbag 46 is developed upward while unfolding, as indicated by double-dotted line in FIG. 1, so that the portion 59 right above the tether 54 is able to deploy in a narrow clearance between the column cover 13 as part of a vehicle body and the knees KL and KR. Moreover, the portion 59 is able to increase the thickness with flowing-in gas G even halfway of inflation of the airbag 46, so that cushioning property is secured, too. Of course, with the gas passages LG and RG formed in the left and right sides of the tether 54, an upper part than the tethers 54 and 53 is developed and inflates widely with inflation gas G flowing upward therethrough, and the inflation of the portion 59 is further promoted by gas G passing through, the gas communication hole 55. As a result, the knees KL and KR having approached the airbag 46 are properly protected.

In comparison with this, if the gas communication hole 55 is located to fall on the transverse center C0 of the airbag 46, an occupant seated out of the transverse center C0 of the airbag is liable to close the gas communication hole 55 with the left knee KL approaching the center C0, so that the airbag has difficulties in providing inflation gas G to the portion 59 right above the tether, and in securing cushioning property in the portion 59.

In the knee-protecting airbag 46 in the foregoing embodiment, therefore, the knees KL and KR of the driver MD are securely protected even if the transverse center C0 of the completely inflated airbag 46 does not conform with the transverse center C1 of the driver MD approaching the airbag 46.

In the illustrated embodiment, the gas communication hole 55 is located in the transverse center of the tether 54. In other words, the airbag 46, during inflation, allows inflation gas G to flow upward via three positions, i.e., via the gas communication hole 55, and the gas passages LG and RG in the left and right sides 54c and 54d of the tether 54, all of which are located symmetrical relative to the transverse center C1 of the driver MD. Accordingly, even if the both knees KL and KR are in positions contactable with the occupant's side base cloth 50 of the unfolding airbag 46 in the course of the inflation of the airbag 46, since the distances from each of the knees KL and KR to the gas communication hole 55 or the gas passages LG and RG are equal, the knees KL and KR are able to receive equal pressure of inflation gas. Consequently, the airbag 46 is able to give equal pressure of inflation gas G to the knees KL and KR, and complete inflation.

Figure 12:
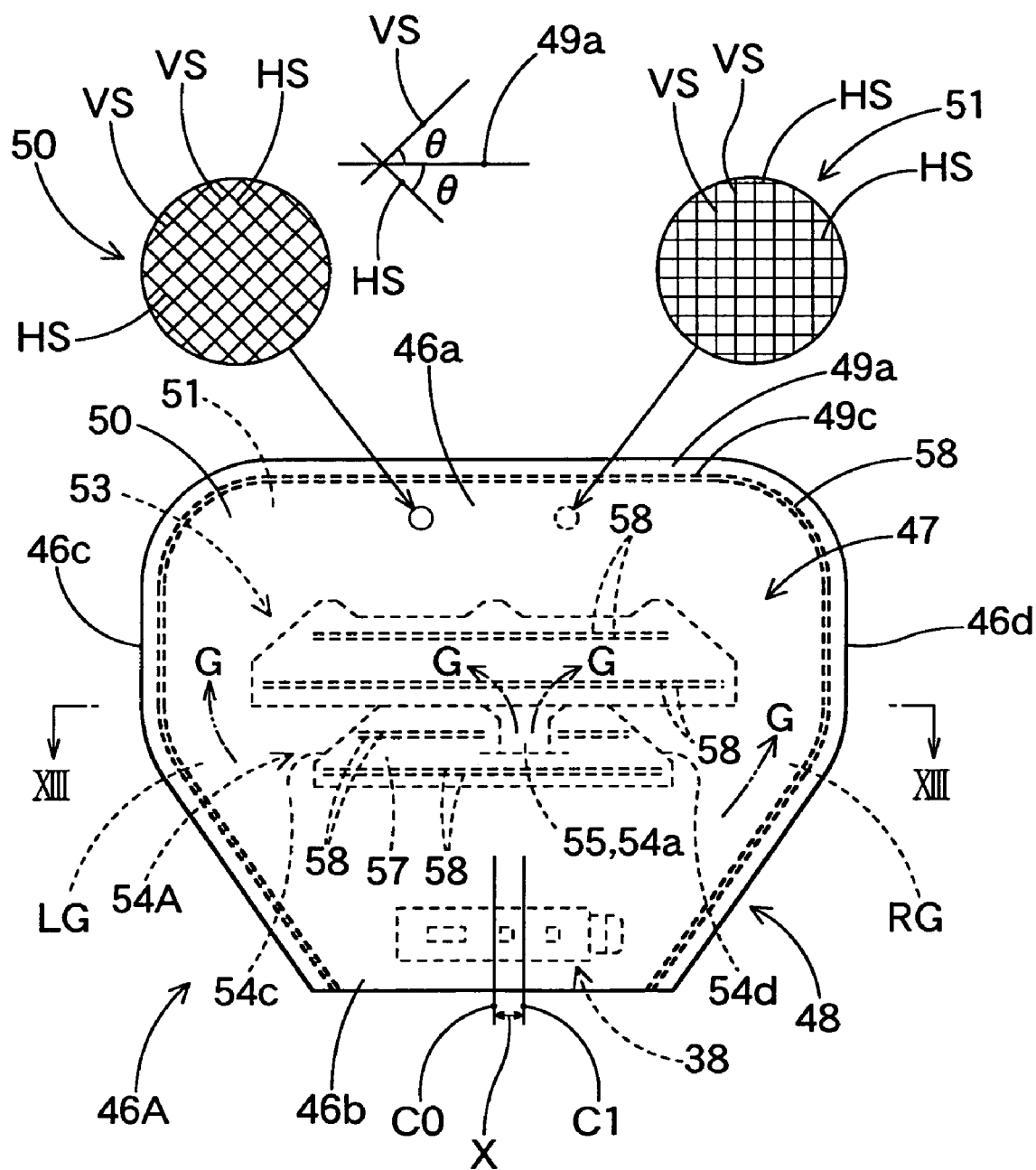
FIG. 12 is a front view of another embodiment of the airbag.
Figure 13:
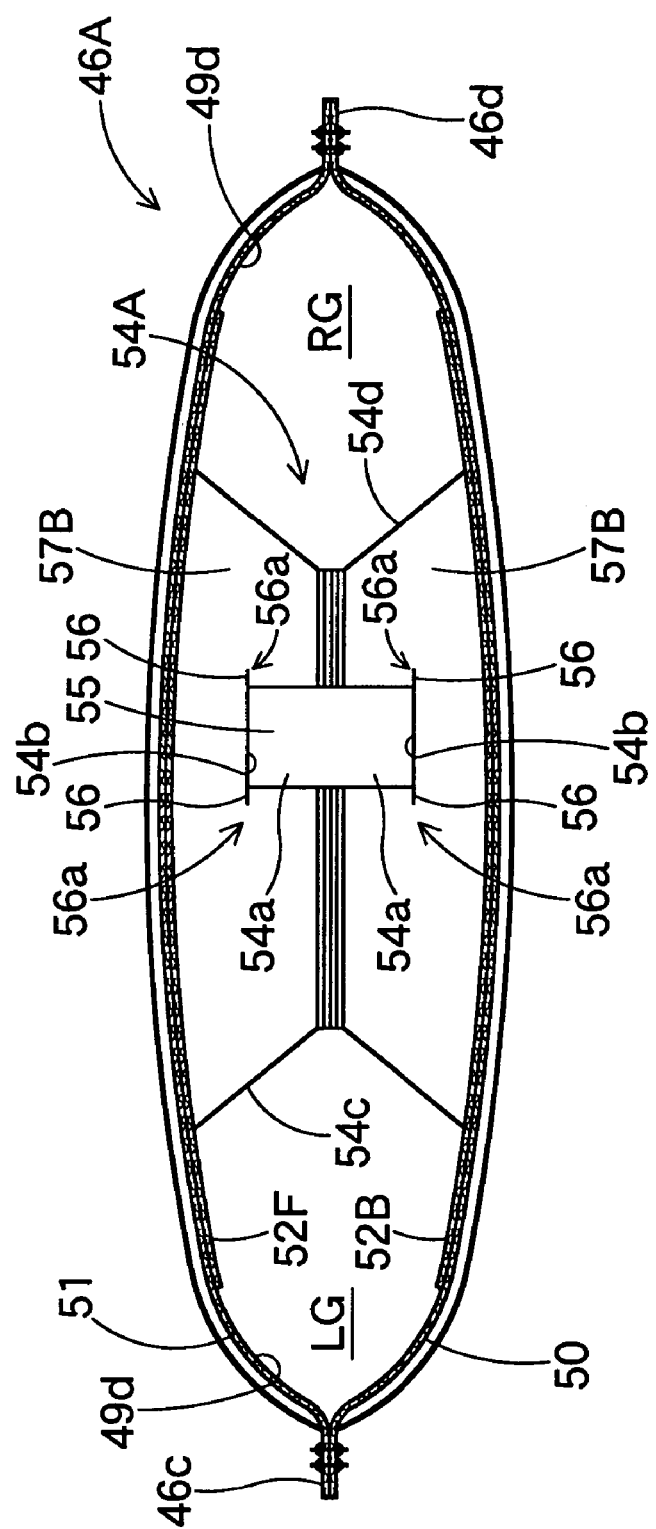
FIG. 13 is a cross section taken along line XIII-XIII of FIG. 12.
Figure 14:
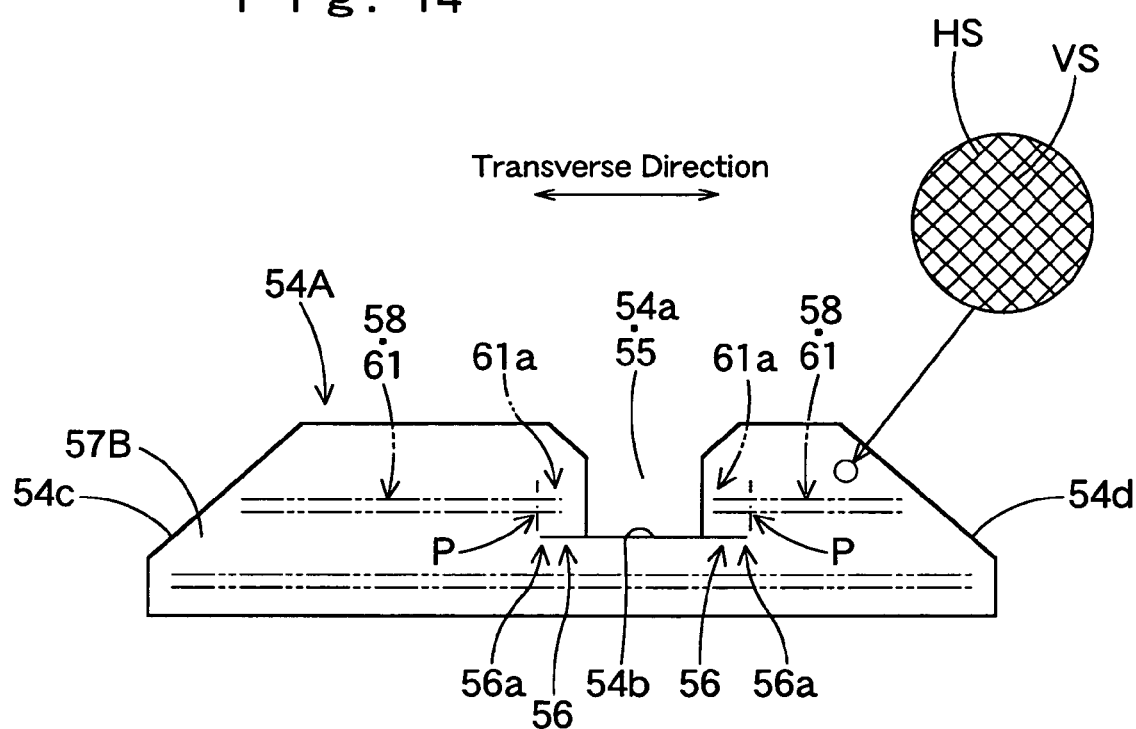
FIG. 14 is a front view of a cloth member for constituting a lower tether of the airbag of FIG. 12.

Without considering above point, the tether may be symmetric relative to the transverse center C0 of the airbag, with an extended left part 54c than the tether 54, as a tether 54A of an airbag 46A shown in FIGS. 12, 13 and 14. The gas communication hole 55 in the tether 54A is on the transverse center C1 of a seated driver MD as an occupant, not on the transverse center C0 of the airbag 46A.

Although the gas communication hole 55 of the tether 54 in the foregoing embodiment is dislocated rightward from the transverse center C0 of the airbag 46 so as to be on the transverse center C1 of the seated driver MD, if the transverse center C1 of a seated occupant is located to the left from the transverse center C0 of the airbag, the gas communication hole should naturally be dislocated leftward from the transverse center C0 of the airbag accordingly.

Moreover, the foregoing embodiment includes two tethers 53 and 54 arranged in up and down rows, and the tether 54 located under is provided with a gas communication hole 55. Accordingly, the airbag body 49 is securely kept in a flat shape upon deployment, by the thickness restraint by the two tethers 53 and 54. Even in this structure, with the communication hole 55 formed in the tether 54 located toward the lower end 46b (or toward the upstream portion 48), inflation gas G is smoothly provided to a portion right above the tether 54, so that the portion is deployed in a narrow clearance between the column cover 13 and knees K, while securing cushioning property. Of course, the tether 53 located toward the upper end 46a may be provided with a gas communication hole.

In the foregoing embodiment, moreover, each of the tethers 53 and 54 includes two pieces of cloth members 57A or 57B whose one end is stitched to the occupant's side base cloth 50 or the vehicle body side base cloth 51, while the other end is stitched up with its counterpart. The cloth members 57B constituting the tether 54 is provided each with a cut-out portion 54a to form the gas communication hole 55 by cutting out a part of the end to be stitched up together. Accordingly, the stitching work of the tethers 53 and 54 to the base cloths 50 and 51 in manufacturing the airbag 46 is facilitated, so that the manufacturing processes of the airbag 46 and its cost are reduced.

In the foregoing embodiment, the tether 54 is provided with notches 56 in the inner circumference 54b of the cut-out portion 54a. If a tension force is applied to the tether 54 along with inflation of the airbag 46, stress concentrates on an area around the leading end 56a of each of the notches 56 in the inner circumference 54b. In each of the stitching portions 61 where the cloth members 57B are stitched up together, a point P where an extension from the leading end 56a of the notch 56 along the direction of the tension force, i.e., a line perpendicular to the stitching portion 61, and the stitching portion 61 intersect usually receives a greatest force, as shown in FIG. 9. In the foregoing embodiment, however, since the leading end 56a of each of the notches 56 is located inward of the tether 54 than the end 61a of the stitching portion 61 and apart from the cut-out portion 54a, in the stitching portion 61, the greatest force is applied to a point inward than the end 61a. Accordingly, when a tension force is applied to the tether 54, less force is applied to the vicinity of the ends 61a of the stitching portions 61, and stress concentration on the stitching yarn 58 in the vicinity of the ends 61a of the stitching portions 61 is reduced, so that stitching strength of the cloth members 57B of the tether 54 is improved even when the tether 54 includes a cut-out portion 54a to form the gas communication hole 55.

In the airbag 46 of the present invention, moreover, the wefts HS of the vehicle body side base cloth 51 are arranged parallel to the upper edge 49a of the completely inflated airbag 46, which extends straight in the transverse direction, so that the vehicle body side base cloth 51 having a substantially rectangular shape is hardly twisted or deformed to slant. On the other hand, the warps VS or the wefts HS in the occupant's side base cloth 50 having a substantially rectangular shape are arranged to intersect with the upper edge 49a at an intersection angle è of 45°, which is bias to the yarn direction of the base cloth 51. Therefore, the base cloth 50 is easy to stretch without affecting the outer edge of the base cloth 51. Consequently, when the knee-protecting airbag 46 deploys with its lower end 46b fixed and leaving its upper end 46a as free end, the upper edge 49a part of the occupant's base cloth 50 and the vehicle body side base cloth 51 is able to develop and inflate substantially along the transverse direction without being twisted or slanted. Along with the upper edge 49a, the upper and lower parts of the airbag 46 continued from the upper edge 49a are also able to develop and inflate without being twisted or slanted.

Therefore, the knee-protecting airbag 46 of the present invention is able to complete inflation without being twisted or slanted.

In the foregoing embodiment, the warps VS or wefts HS of the vehicle body side base cloth 51 are parallel to the upper edge 49a of the completely inflated airbag 46 extending straight in the transverse direction. To the contrary, however, it will also be appreciated that the occupant's side base cloth 50 is employed as the parallel base cloth whose warps VS or wefts HS are parallel to the upper edge 49a of the completely inflated airbag 46 extending straight in the transverse direction, while the vehicle body side base cloth 51 is employed as the intersecting base cloth whose warps VS or wefts HS intersect with the upper edge 49a at 45°. With this arrangement, too, the airbag is able to complete inflation without being twisted or slanted.

However, if the occupant's side base cloth 50 is the intersecting base cloth whose warps VS or wefts HS intersect with the upper edge 49a at intersection angle è of about 45° as in the foregoing embodiment, in the occupant's side base cloth 50, the warps VS and wefts HS intersect with each of sides of the occupant's side base cloth 50 having a substantially rectangular shape on the bias, which makes the occupant's side base cloth more stretchable. To the contrary, the vehicle body side base cloth 51 is hard to stretch since the warps VS and wefts HS are parallel to each of sides of the base cloth 51 having a substantially rectangular shape. In otherwords, since the occupant's side base cloth 50 stretches while the vehicle body side base cloth 51 does not upon deployment of the airbag 46, the occupant's side base cloth 50 becomes likely to bulge than the vehicle body side base cloth 51, which makes it easier for the vehicle body side base cloth 51 to be proximate to the column cover 13 as part of the vehicle body. As a result, the airbag 46 becomes more likely to deploy upward along the rear surface 13a of the vehicle structural member 13 without unnecessarily protruding toward the knees K of the occupant MD, so that the inflating airbag 46 easily enters and deploys in a narrow clearance between the knees K of the occupant MD and the vehicle structural member 13 located forward of the knees K.

When the occupant's side base cloth 50 is employed as the parallel base cloth whose warps VS or wefts HS are substantially parallel to the upper edge 49a of the completely inflated airbag 46 extending straight in the transverse direction, while the vehicle body side base cloth 51 is employed as the intersecting base cloth whose warps VS or wefts HS intersect with the upper edge 49a at 45°, the occupant's side base cloth 50 formed of a single piece of cloth member except the reinforcing patch 52B becomes hard to stretch. In this case, it is prevented that the stitching yarn 58 enlarges the weave of the base cloth in the left and right edges 46c and 46d.

Although the foregoing embodiment has been described as applied to the knee-protecting airbag 46 for a driver's seat, the present invention may naturally be applied to a knee-protecting airbag for a front passenger's seat.

What is claimed is:

1. A knee-protecting airbag folded and housed in front of a vehicle seat and deployable for protecting an occupant's knees, the airbag comprising:

an airbag body including an occupant's side wall to be located toward an occupant as the airbag body is completely deployed and a vehicle body side wall located toward the vehicle body, wherein a lower part of the airbag body serves as an upstream, and an upper part of the airbag body saves as a downstream, respectively of flowing-in inflation gas; and a tether located within the airbag body, the tether joining the occupant's side wall and the vehicle body side wall for keeping the airbag body as inflated substantially in a flat shape, the tether being arranged along the transverse direction of the inflated airbag body in a band shape, whereby passages for gas are formed between the left and right ends of the tether and the left and right edges of the airbag in the inner circumference of the airbag body, wherein:

the tether includes a gas communication hole proximate to the transverse center thereof for allowing inflation gas to flow upward therethrough; and the gas communication hole is dislocated from the transverse center of the completely inflated airbag, whereby the gas communication hole is located to face the transverse center of a location where an occupant would be seated.

2. The knee-protecting airbag according to claim 1, wherein the gas communication hole of the tether is located in the transverse center of the tether.

3. The knee-protecting airbag according to claim 1, wherein:

the tether is constituted by two pieces of cloth members, each of the cloth members being stitched at one end side to either the occupant's side wall or the vehicle body side wall, and being stitched up together with the other cloth member at the other end side; and each of the cloth members includes a cut-out portion for forming the gas communication hole, the cut-out portion being formed by cutting out a part of the end side to be stitched up together with the other cloth member.

4. The knee-protecting airbag according to claim 3, wherein:

stitching portions for stitching up the two cloth members of the tether are formed linearly and substantially along the transverse direction in the left and right sides of the cut-out portion; and notches are formed in the inner circumference of the cut-out portion such that a leading end of each of the notches is located inside of the tether than the end of each of the stitching portions.

5. A knee-protecting airbag folded and housed in front of a vehicle seat and deployable for protecting an occupant's knees, the airbag comprising:

an airbag body including an occupant's side wall to be located toward an occupant as the airbag body is completely deployed and a vehicle body side wall located toward the vehicle body, wherein a lower part of the airbag body serves as an upstream, and an upper part of the airbag body serves as a downstream, respectively of flowing-in inflation gas; and a plurality of tethers juxtaposed along the vertical direction within the airbag body, each of the tethers joining the occupant's side wall and the vehicle body side wall for keeping the airbag body as inflated substantially in a flat shape, each of the tethers being ranged along the transverse direction of the inflated airbag body in a band shape, whereby passages for gas are formed between the left and right ends of the tethers and the left and right edges of the airbag in the inner circumference of the airbag body, wherein:

at least one of the plurality of tethers is located in the lowermost portion of the airbag as completely inflated and includes a gas communication hole proximate to the transverse center thereof allowing inflation gas to flow upward therethrough; and the gas communication hole is dislocated from the transverse center of the completely inflated airing, whereby the gas communication hole is located to face the transverse center of a location where an occupant would be seated.

\* \* \* \* \*